United States Patent [19]
Ladouceur et al.

[11] Patent Number: 5,564,873
[45] Date of Patent: Oct. 15, 1996

[54] SELF-ATTACHING FASTENING ELEMENT AND METHOD OF ATTACHMENT

[75] Inventors: Harold A. Ladouceur, Livonia, Mich.; Rudolf R. M. Muller, Frankfurt, Germany

[73] Assignee: Multifastener Corporation, Detroit, Mich.

[21] Appl. No.: 430,125

[22] Filed: Apr. 25, 1995

Related U.S. Application Data

[60] Continuation of Ser. No. 92,593, Jul. 16, 1993, abandoned, which is a division of Ser. No. 888,580, May 26, 1992, Pat. No. 5,237,733, which is a continuation-in-part of Ser. No. 806,172, Dec. 12, 1991, Pat. No. 5,146,672, which is a division of Ser. No. 271,123, Nov. 14, 1988, Pat. No. 4,893,394, which is a division of Ser. No. 111,966, Oct. 21, 1987, Pat. No. 4,831,698, which is a continuation-in-part of Ser. No. 69,804, Aug. 17, 1987, Pat. No. 4,810,143, which is a division of Ser. No. 869,507, Jun. 2, 1986, Pat. No. 4,700,470, which is a division of Ser. No. 657,570, Oct. 4, 1984, Pat. No. 4,610,072, which is a continuation-in-part of Ser. No. 563,833, Dec. 21, 1983, Pat. No. 4,555,838, which is a continuation-in-part of Ser. No. 504,074, Jun. 14, 1983, Pat. No. 4,543,701, and Ser. No. 485,099, Mar. 28, 1983, Pat. No. 4,459,073, said Ser. No. 504,074, is a continuation of Ser. No. 229,274, Jan. 28, 1981, abandoned, said Ser. No. 485,099, is a division of Ser. No. 229,274.

[30] Foreign Application Priority Data

Feb. 2, 1980 [DE] Germany ..................... 3003908

[51] Int. Cl.[6] ..................... F16B 37/04
[52] U.S. Cl. ..................... 411/180; 411/179; 411/187
[58] Field of Search ..................... 411/181, 180, 411/179, 184, 187, 959, 968

[56] References Cited

U.S. PATENT DOCUMENTS

| | | | |
|---|---|---|---|
| 1,579,875 | 4/1926 | Lundberg | 411/180 |
| 2,026,757 | 1/1936 | Swanstrom | 411/180 |
| 2,415,695 | 2/1947 | Kann | 411/180 |
| 3,213,914 | 10/1965 | Baumle et al. | 411/179 |
| 3,276,499 | 10/1966 | Reusser | 411/179 |
| 3,461,936 | 8/1969 | Rosan, Sr. et al. | 411/181 X |
| 3,938,239 | 2/1976 | Lauth | 411/181 |
| 3,976,669 | 7/1976 | Egner | 411/184 |
| 4,018,257 | 4/1977 | Jack | 411/181 |
| 4,557,650 | 12/1985 | Molina | 411/180 X |
| 4,627,776 | 12/1986 | Pamer et al. | 411/179 |
| 4,732,518 | 3/1988 | Toosky | 411/181 |
| 4,810,143 | 3/1989 | Muller | 411/181 |
| 4,831,698 | 5/1989 | Muller | 411/181 X |
| 5,207,588 | 5/1993 | Ladouceur et al. | 411/181 X |
| 5,251,370 | 10/1993 | Muller et al. | 411/180 X |

FOREIGN PATENT DOCUMENTS 920847 12/1954 Germany.

Primary Examiner—Rodney M. Lindsey
Attorney, Agent, or Firm—Howard & Howard

[57] ABSTRACT

A self-attaching fastening element, such as a nut fastener, having a body portion and an integral annular riveting barrel portion. The body portion includes axial grooves and, in the preferred embodiment of the nut-type fastener, the body portion includes a radial flange and the grooves extend radially from the body portion into the flange portion. In the most preferred embodiment, the body portion is polygonal and the axial grooves are located in the juncture of adjacent flat surfaces. The method of attaching the self-attaching fastening element of this invention to a panel includes forming an opening in the panel coaxially aligned with the barrel portion having a diameter less than the barrel portion, driving the barrel portion into the panel, thereby drawing a cone-shaped portion in the panel receiving the body portion, driving the body portion into the cone-shaped panel portion, deforming the panel portion into the body portion and the axial grooves. The free end of the barrel portion may be simultaneously deformed radially to form a mechanical interlock with the panel. Where the body portion includes a radial flange, the flange is driven into the panel and the panel is driven into the radial grooves, preventing relative rotation of the fastening element in the panel.

13 Claims, 3 Drawing Sheets

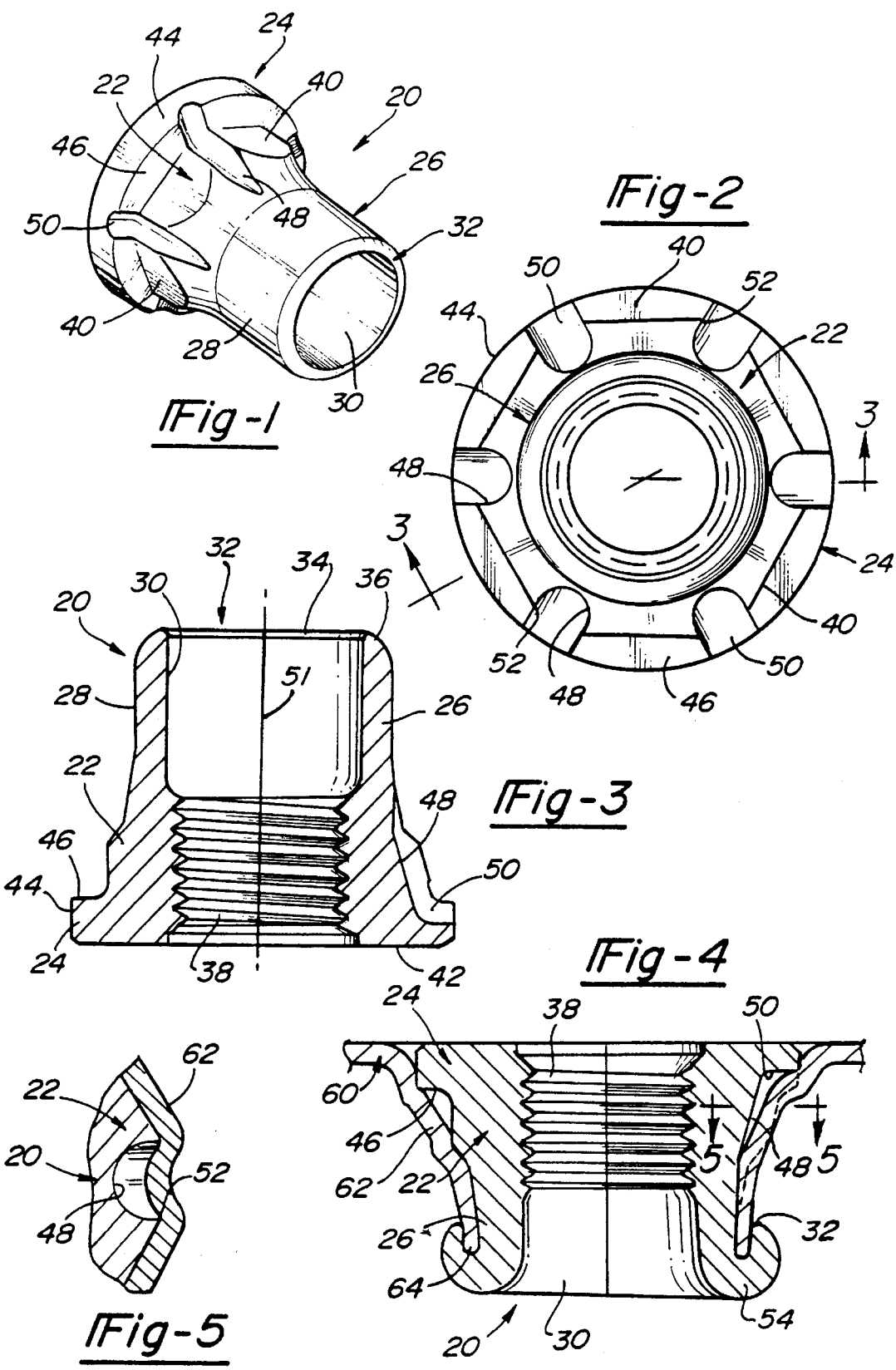

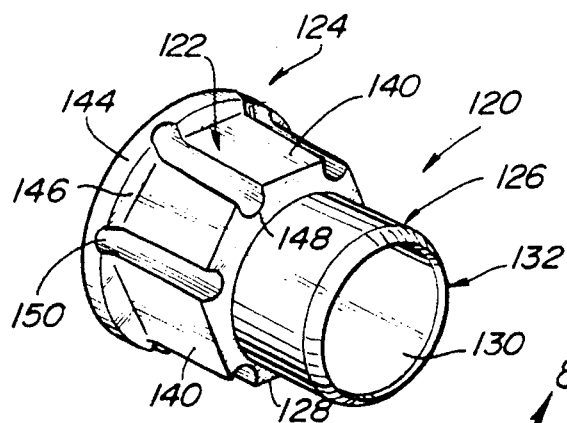
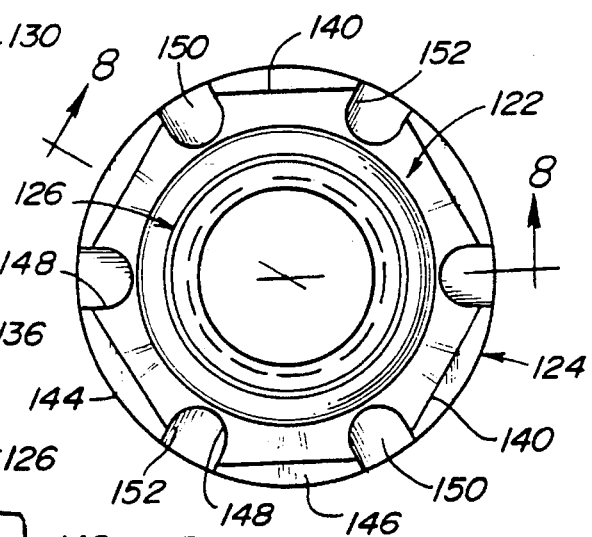
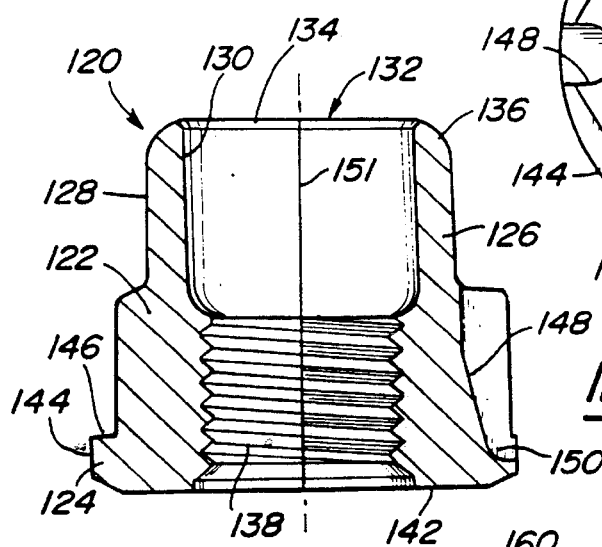
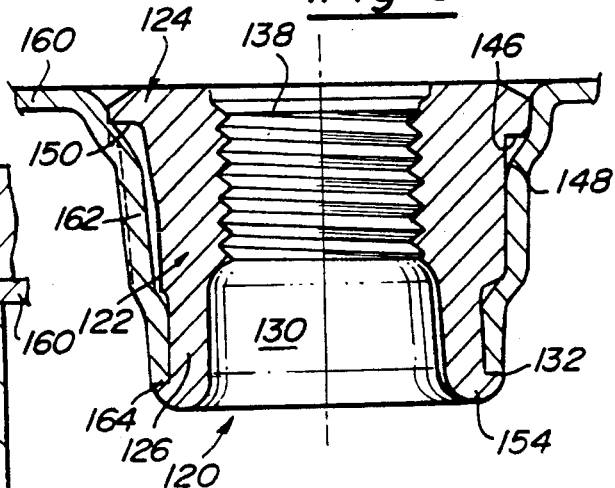
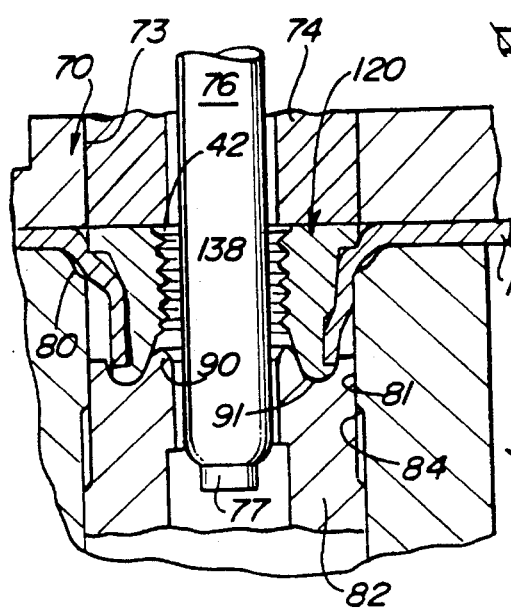

SELF-ATTACHING FASTENING ELEMENT AND METHOD OF ATTACHMENT

RELATED APPLICATIONS

This application is a continuation of Ser. No. 08/092,593 filed Jul. 16, 1993 now abandoned which is a divisional application of application Ser. No. 888,580, filed May 26, 1992, now U.S. Pat. No. 5,237,733, which application was a continuation-in-part application of application Ser. No. 806,172, filed Dec. 12, 1991, now U.S. Pat. No. 5,146,672, which application was a division of Ser. No. 457,060, filed Dec. 26, 1989, now U.S. Pat. No. 5,072,518, which was a division of Ser. No. 271,123, filed Nov. 14, 1988, now U.S. Pat. No. 4,893,394, which was a division of Ser. No. 111,966, filed Oct. 21, 1987, now U.S. Pat. No. 4,831,698, which was a continuation-in-part of Ser. No. 069,804, filed Aug. 17, 1987, now U.S. Pat. No. 4,810,143, which was a division of Ser. No. 869,507, filed Jun. 2, 1986, now U.S. Pat. No. 4,700,470, which was a division of Ser. No. 657,570, filed Oct. 4, 1984, now U.S. Pat. No. 4,610,072, which was a continuation-in-part of Ser. No. 563,833, filed Dec. 21, 1983, now U.S. Pat. No. 4,555,838, which was a continuation-in-part of Ser. No. 504,074, filed Jun. 14, 1983, now U.S. Pat. No. 4,543,701 and a continuation-in-part of Ser. No. 485,099, filed Mar. 28, 1983, now U.S. Pat. No. 4,459,073. Ser. No. 504,074 was a continuation of Ser. No. 229,274, filed Jan. 28, 1981, now abandoned and Ser. No. 485,099 was a divisional application of Ser. No. 229,274. Ser. No. 229,274 claims priority to an application filed in the Federal Republic of Germany, No. 3,003,908, filed Feb. 2, 1980.

FIELD OF THE INVENTION

The present invention relates to improved self-attaching or self-riveting fasteners, such as nut-type fasteners and methods and apparatus for installing such fasteners. More particularly, the invention disclosed herein relates to self-attaching fasteners which may be installed in a thin metal panel in a continuous assembly operation.

BACKGROUND OF INVENTION

The present invention relates to improvements in self-attaching fasteners which significantly improves the strength of the installation of the fastener in a panel, such as the relatively thin steel panels used by the automotive and appliance industries. Although the improved fastening elements of this invention are described in regard to improved nut-type female fasteners, the improvements may also be applied to male stud-type fasteners as disclosed, for example, in U.S. Pat. No. 4,555,838.

The automotive industry utilizes self-piercing female fasteners which may also be simultaneously clinched to secure the nut in the pierce panel opening as described, for example, in U.S. Pat. Nos. 3,299,500 and 3,314,138 assigned to the assignee of the present application. The prior art also includes a number of self-riveting nuts, including nuts having an annular skirt or barrel portion, wherein the free end of the barrel is deformed radially outwardly in a die member to form a mechanical interlock with the panel as disclosed, for example, in U.S. Pat. Nos. 4,398,239 and 4,018,257. The self-riveting nuts disclosed in such patents are, however, secured to a panel in a pre-pierced panel opening, requiring two separate operations. The method of installing the nut fastener disclosed in these patents also require very precise centering of the nut relative to the pre-pierced panel opening, wherein a spring-biased pin is received through the panel opening and the nut is centered on the pin, prior to installation. U.S. Pat. No. 3,926,236, also assigned to the assignee of the present application, discloses a method of attaching a nut wherein the panel is pierced by a punch which extends through the nut bore to pierce and secure the nut in a continuous operation. However, the fastener is not a riveting-type fastener having a barrel portion extending through the pierced panel opening. Self-riveting fasteners have also been used by the container industry for attaching a closure flange or tag ring for reception of a threaded plug as disclosed, for example, in U.S. Pat. No. 3,800,401.

This application and the above-identified related patents and applications disclose methods and apparatus for permanently attaching male and female elements to a panel, such as nuts and bolts, in a continuous operation. The preferred methods of installation do not require pre-piercing of the panel, although the self-attaching fastening elements of this invention may be installed in a pre-pierced panel opening. Certain difficulties have, however, been experienced in installing female fastening elements in a panel, particularly where the barrel portion of the female element is used to pierce the panel opening. As will be understood, if the female fastening element is a nut-type fastener, the bore of the nut must remain clear of obstructions following installation for receipt of a stud or bolt. The method of installation and installation apparatus is preferably also suitable for mass production applications, such as used by the automotive and appliance industries.

Self-riveting fasteners of the type disclosed herein are particularly strong in resisting pull-out and cam-out. Pull is tested by threading a bolt in the threaded bore of the female fastener and pulling in a direction opposite to the direction of installation. The pull-out strength in many applications is greater than the tensile strength of the bolt. Cam-out is the strength of the installation to a cantilevered load. However, certain applications, such as automotive seat track and belt applications, require improvements in push-through strength and resistance to torque. Resistance to torque is generally provided by barbs or ribs on the body of the fastening element, which may result in stress cracks in the panel. The need therefore remains for a self-attaching fastener and method of installation which results in a very strong fastener and panel assembly, including improved torque resistance and push-through strength.

SUMMARY OF THE INVENTION

The improved self-attaching fastening element, method of installation and installation apparatus of this invention results in an improved fastener and panel assembly. The self-attaching fastening element includes a body portion and an integral generally coaxially aligned annular riveting barrel portion. In the most preferred embodiment, the body portion includes a radial flange portion opposite the barrel portion. The body portion includes a plurality of axially extending grooves, preferably having a concave arcuate contour. As described below, the axial grooves extend in the direction of installation of the self-attaching fastening element. In the most preferred embodiment of the invention, the grooves continue radially from the body portion in the underside of the flange adjacent the body portion, such that panel metal is deformed into the grooves first in the body portion and then in the flange as the body portion and flange are sequentially driven into the panel. In the most preferred embodiment of the self-attaching fastening element, the body portion includes a polygonal exterior surface having a plurality of flat surfaces and the lineal grooves are located in the juncture of adjacent flat surfaces. Where the body portion is hexagonal, for example, the fastening element may include six axial grooves, although three grooves may be sufficient, and grooves may also be provided in the flat surfaces.

The method of installing a self-attaching fastening element of this invention includes forming an opening in the panel which is to receive the fastening element coaxially aligned with the barrel portion. In the most preferred embodiment, the inside diameter of the panel opening is initially less than the inside diameter of the annular barrel portion. In the most preferred method of installing a nut or female fastener, the panel opening is formed by a punch driven through the bore of the female fastening element. However, the panel may be pre-pierced or the barrel portion may be used to pierce the panel opening, particularly where the fastening element is a stud-type male fastener.

The free end of the barrel portion is then driven against the panel and through the panel opening. In the most preferred method of this invention, the panel adjacent the panel opening is first drawn into a tubular or cone-shaped portion which receives the body portion of the nut. The body portion of the nut is then driven into the cone-shaped panel portion, simultaneously deforming the panel into the axial grooves in the body portion of the self-attaching fastening element. Where the self-attaching fastening element includes a radial flange having radial grooves, as described above, the flange portion is then driven into the panel and the panel into the radial grooves, forming a very secure assembly having substantially improved torque resistance and resistance to push-through. For example, the push-through strength was more than tripled compared to a nut of the type disclosed in U.S. Pat. No. 4,831,698. The torque resistance was improved to the point where a hardened bolt threaded in the female fastener failed in torque, without distortion of the panel.

The improved installation apparatus of this invention includes an improved female die member or die button. The most preferred embodiment of the die button includes a spring-biased central die post member which includes an axial bore which receives the reciprocal punch and an annular concave cavity surrounding the bore and located entirely within the die post member. This improvement substantially reduces die breakage and has resulted in improved fastener and panel assemblies. Other advantages and meritorious features of the present inventions will be more fully understood from the following description of the preferred embodiments and methods of this invention, the claims and the appended drawings, a brief description of which follows.

BRIEF DESCRIPTION OF THE DRAWINGS

FIG. 1 is a perspective end view of a female nut embodiment of the self-attaching fastening element of this invention;

FIG. 2 is a barrel-end view of the self-attaching fastening element of FIG. 1;

FIG. 3 is a cross-sectional view of the self-attaching fastening element of FIG. 2 in the direction of view arrow 3—3;

FIG. 4 is a cross-sectional side view of the fastening element of FIGS. 1 to 3 similar to FIG. 3, except that the fastening element has been installed in a panel;

FIG. 5 is a partial cross-sectional view of FIG. 4 in the direction of view arrows 5—5;

FIG. 6 is a plan view of a second embodiment of the self-attaching fastening element of this invention;

FIG. 7 is a barrel-end view of the fastening element shown in FIG. 6;

FIG. 8 is a side cross-sectional view of FIG. 7, in the direction of view arrows 8—8;

FIG. 9 is a cross-sectional view similar to FIG. 8, after the self-attaching fastening element has been installed in a panel;

FIG. 10 is a side cross-sectional view of the fastener and panel assembly in an installation apparatus;

DESCRIPTION OF THE PREFERRED EMBODIMENTS

Figure 11:
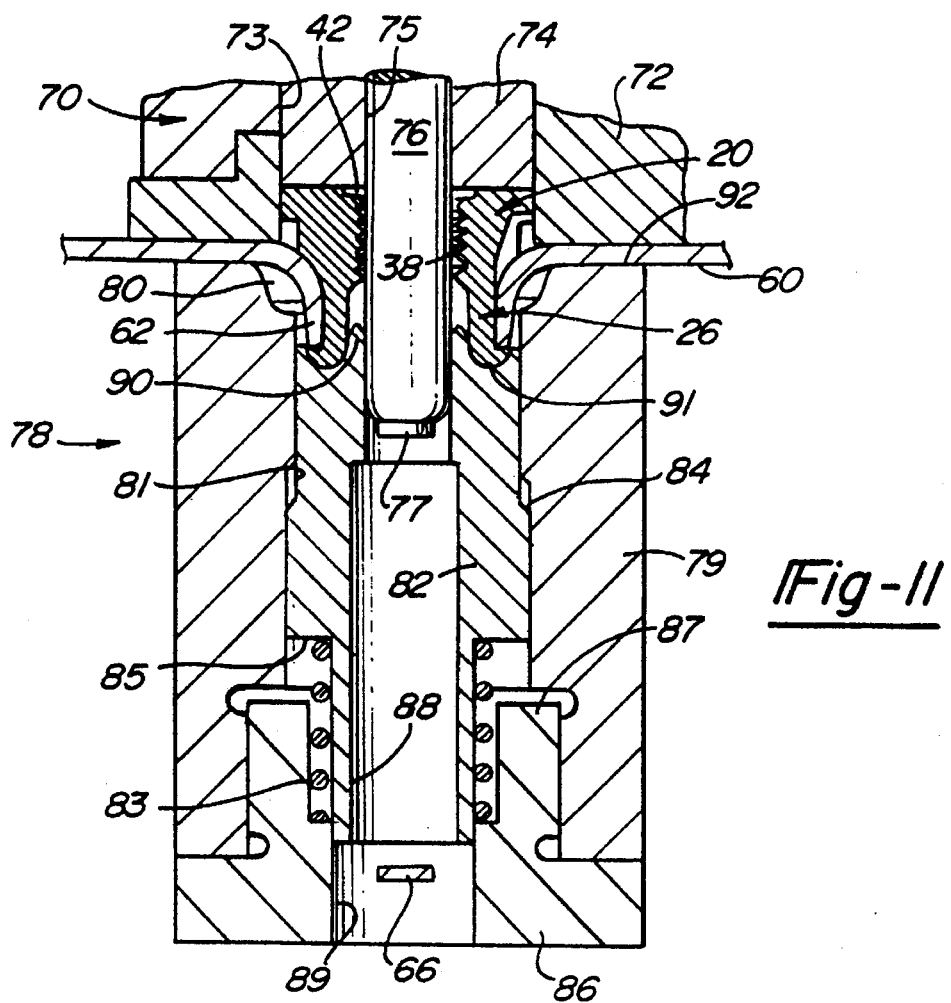
FIG. 11 is a cross-sectional side view of the installation apparatus of FIG. 10 during installation of the self-attaching fastening element shown in FIGS. 1 to 4.

FIGS. 1 to 5 illustrate one embodiment of the self-attaching fastening element of this invention in the form of a female nut fastener 20. The disclosed nut and method may be considered an improvement of the self-riveting nut fastener, method of installation and installation apparatus disclosed in U.S. Pat. No. 4,831,698. Although the nut fastener and panel assembly disclosed in this patent has been commercially successful and provides many advantages over the prior art, further improvements in the strength of the installation of the fastening element in a panel are required for certain applications. More specifically, certain applications where the fastening element is permanently attached to a sheet metal panel or structural element require the assembly to withstand extreme forces. For example, an automotive seat application may require the nut and panel assembly to withstand torsion which will break an M8 hardened bolt without materially affecting the nut and panel assembly. The assembly must also be able to withstand extreme pull-out, push-through and torsional forces. The automotive industry presently uses weld nuts for such applications. However, weld nuts require complex and bulky equipment and the weld must be inspected to assure proper installation. The self-attaching fastening element of this invention will withstand extreme forces in all planes, including torsion, push-through and pull-out forces which would result in failure of other types of self-attaching fastener and panel assemblies. Although the disclosed embodiments of the self-attaching fasteners of this invention are female nut fasteners, it should be understood that the improvements disclosed herein may be applied to the stud-type fasteners disclosed in the above-referenced U.S. patents.

The embodiment of the self-riveting nut fastener 20 disclosed in FIGS. 1 to 5 includes a body portion 22, a radial flange portion 24 at one end of the body portion and an annular barrel portion 26 at the opposite end of the body portion. In the disclosed embodiment, the annular barrel portion 26 is cylindrical and tubular having a smooth outside surface 28 and a smooth inside surface 30. The free end 32 of the barrel portion includes an inside conical chamfer 34 as shown in FIG. 3 and an arcuate outside surface 36. The body portion 22 includes a threaded bore 38 coaxially aligned with the inside cylindrical surface 30 of the annular barrel portion 26.

In the most preferred embodiment of the nut fastener of this invention, the body portion 22 is polygonal having a plurality of flat surfaces 40. In the disclosed embodiment, the body portion 22 is hexagonal and includes six flats 40. It will be understood, however, that the body portion may be octagonal, cylindrical or other suitable shapes. In the preferred embodiment of the fastening element of this invention, however, the major diameter of the body portion 22 is greater than the diameter of the outside surface 28, as best shown in FIG. 3.

The radial flange portion 24 in the disclosed embodiment includes a driven surface 42, which may be flat to receive a driving element, as described below, a cylindrical outside surface 44 and a clinching surface 46 adjacent the body portion 22. The configuration of the flange is not as important as the fact that the radial flange extends radially beyond the major diameter of the body portion 22, such that the flange portion 24 prevents push-through of the nut in a panel assembly, as described below.

The fastening element of this invention includes a plurality of axial grooves 48 in the body portion 22. That is, the grooves 48 extend generally parallel to the axis 51 of the fastening element in the direction of installation. Where the body portion is polygonal, as disclosed herein, the linear grooves 48 in the body portion are preferably located in the juncture of adjacent flats 40, as shown in FIG. 2. In the hexagonal embodiment disclosed in FIGS. 1 to 5, the body portion includes six axial grooves located in the juncture of adjacent flat surfaces, providing maximum torque resistance, as discussed below.

It has further been discovered that extending the axial grooves 48 radially into the clinching surface 46 of the flange portion provides a substantial improvement in torque resistance. In the most preferred embodiment, the radial portions 50 of the grooves are continuous with the axial portions 48, defining a continuous groove beginning adjacent the barrel portion 26 and extending to the outside surface 48 of the flange portion. As best shown in FIG. 2, the groove is concave and semi-circular and the outside surface 28 of the barrel portion is generally tangential to, but slightly offset from the bottom surface of the axial grooves 48. The flat surfaces 40 extend to the grooves and define relatively sharp edges 52.

FIGS. 5 and 6 illustrate the self-attaching fastening element 20 installed in a panel 60. As described, the self-attaching fastening elements of this invention are particularly suitable for attachment in mass production applications to the relatively thin metal panels used by the automotive and appliance industries. For example, the female nut fasteners disclosed herein may be attached to relatively thin panels having a thickness of approximately 0.025 inches to relatively thick panels having a thickness of about 0.10 inches or greater. The dimensions of the female element will, of course, depend upon the desired thread diameter, the thickness of the panel and the particular application. A female element, such as a self-riveting nut, may be formed of medium carbon steels, and installed in a wide variety of metal panels, including low and medium carbon steels. Reference should also be made to the above-identified related patents and applications, the disclosures of which are incorporated herein by reference, which further disclose details of installations and installation apparatus. As will be understood, the method and installation apparatus of this invention is an improvement of the methods and apparatus previously described adapted for particular applications, as disclosed herein.

Figure 12:
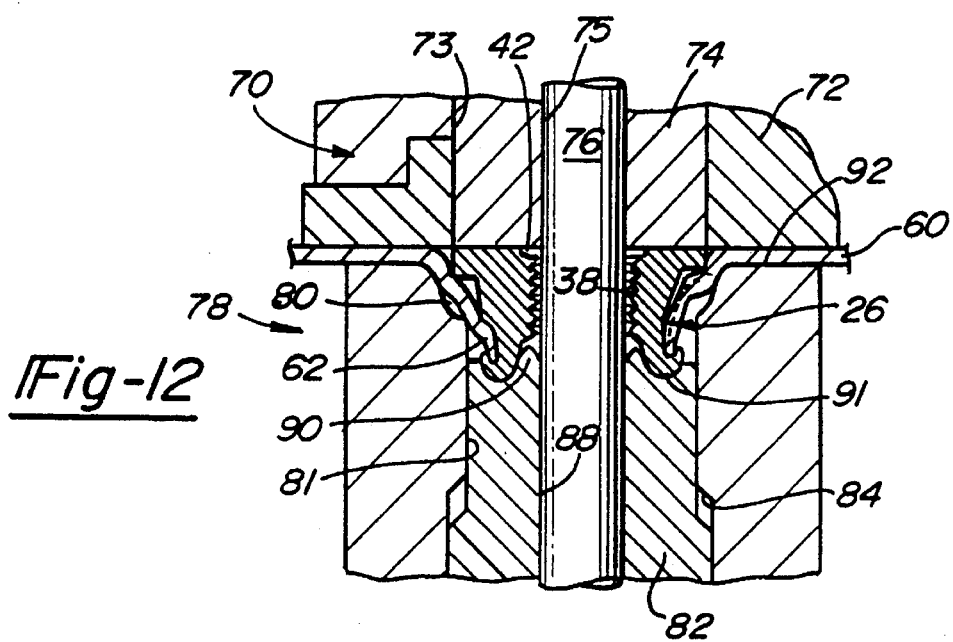
FIG. 12 is a partial side cross-sectional view of the installation apparatus similar to FIG. 11 following installation of the self-attaching fastener element.

FIGS. 11 and 12 illustrate a preferred embodiment of the female die assembly, installation apparatus and method of installing the fastening element 20 illustrated in FIGS. 1 to 5. The installation apparatus disclosed in FIG. 11 includes an installation head 70 which receives the fastening elements for installation in a panel 60. Details of the installation head are disclosed in the above-referenced U.S. Pat. No. 4,831, 698. As shown herein, the installation head includes a nose member 72 having a passage or bore 73 which receives reciprocal plunger 74. The free end of the plunger is driven against driven surface 42 of the fastening element 20 to drive the free end of the barrel portion 26 into the panel 60. The plunger 74 in the disclosed embodiment includes a cylindrical bore 75 which receives a piercing punch 76 having a cylindrical piercing end 77 which pierces a slug 66 from the panel as described below.

The installation apparatus further includes a female die assembly or die button 78 which supports the panel 60 and forms a mechanical interlock between the fastening element 20 and the panel as described below. The female die assembly 78 includes a die member housing 79 having a central die opening 80 which receives the panel during installation of the fastening element and which opens into a configured bore 81 which receives the spring-biased reciprocal die post member 82. In the disclosed embodiment, the die post member is spring-biased by a conventional spiral spring 83; however, any suitable spring-biasing means may be utilized, including resilient polymers. The die post member is preferably spring-biased to maintain control of a slug 66 (see FIG. 11) pierced from the panel. In certain applications, such as where the panel is pre-pierced, the post member 82 may be integral with housing 79. The reciprocal die post member 82 includes a conical shoulder 84 which limits upward movement of the die post member and a lower shoulder 85 which receives the spring 83 and limits downward movement of the die post member. Ring member 86, which is bolted or otherwise secured to the open end of die member housing 79, includes an upper end 87 which receives the shoulder 85 and limits downward movement of the die post member.

The upper end of the die post member 82 includes a central die post 90 surrounded by an annular concave die cavity 91. The free end of the die post 90 is preferably located above the annular die cavity 91 to receive the inside surface of the barrel portion 26 of the fastening element, as described below, and the outside surface of the central die post is preferably smooth, arcuate and convex and blends smoothly with the arcuate concave surface of the annular die cavity 91.

As described more fully in U.S. Pat. No. 4,831,698 and the above-referenced related U.S. patents, the installation apparatus and fastening elements of this invention are particularly although not exclusively adapted for mass production applications, such as utilized by the automotive industry. In such applications, the installation head 70 may be received within and attached to one die shoe of a die press and the female die button 78 may be attached to the opposite die shoe. The press may then be utilized to form panel 60 into a structural element, such as a bracket, or an automotive or appliance body panel. References herein to up or down are for purposes of description of the drawings only. The installation head 70, for example, may be attached to either the upper or lower die shoe and the fastening element 20 may be installed upwardly or downwardly.

In the preferred method of installing the fastening element 20 in the disclosed apparatus, the punch 76 is first driven through the threaded bore 38 of the fastening element 20 against the panel 60. The panel is supported on a flat annular surface 92 of the die button which surrounds the die cavity.

The piercing end 77 of the punch is then driven against the panel to preferably first draw a cone-shaped portion 62 (see also FIG. 4). A cylindrical slug 66 is then pierced by the cylindrical post 77 and the free end of the barrel portion 26 is driven against the panel and through the panel opening, as shown in FIG. 11. The slug 66 is received and discharged through bores 88 and 89 in the die post member 82 and ring member 86, respectively. The free end of the barrel portion is then driven by the plunger 74 against the convex arcuate surface of the die post 90 and then radially outwardly into the annular concave die cavity 91 as best shown in FIG. 11. As the fastening element 20 is driven downwardly by the plunger 74, the central die post member 82 is driven downwardly in the configured bore 81 of the die member housing 79 until the shoulder 85 of the die post member engages the shoulder 87 of ring member 86. The die button 78 is then fixed and the free end 32 of the barrel portion is driven radially outwardly in the annular die cavity 91, forming a U-shaped channel 54 which receives the circular edge 64 of the panel, forming a very secure mechanical interlock between the nut and panel as shown in FIGS. 12 and 4.

During this installation of the nut member 20 in the panel 60, panel metal is permanently deformed into the axial and radial grooves 48 and 50, as now described. As the body portion 22 of the fastening element is driven into the cone-shaped panel portion as shown in FIG. 11, the panel is simultaneously driven into the axial grooves 48. Where the axial grooves 48 are located at the juncture of adjacent flat surfaces 40 of the polygonal body portion, the edges 52 are located in the major diameter of the body portion, such that substantial panel material is driven into the grooves, as shown in FIG. 5. Where the grooves continue radially in the clinching face 46 of the radial flange portion 24, the panel metal is channelled from the axial grooves 48 into the radial grooves 50 as the flange portion 24 is driven into the panel, forming a secure interlock between the nut and panel which resists turning of the nut 20 in the panel 60. The right-hand cross-section of FIG. 4 illustrates the extent of deformation of the panel in the axial and radial grooves in the nut.

FIGS. 6 to 8 illustrate a second embodiment of a self-riveting female fastening element 120 and a nut and panel assembly in FIG. 10. Reference numerals in FIGS. 6 to 10 for the same or similar elements are numbered the same as FIGS. 1 to 5, except that 100 has been added to the reference numerals of FIGS. 6 to 10. The self-riveting nut fastener 120 includes a body portion 122, a radial flange portion 124 integral with the body portion at one end and an integral barrel portion 126 at the opposite end of the body portion. In the disclosed embodiment, the annular barrel portion 126 is cylindrical and tubular having a smooth cylindrical outside surface 128 and a smooth cylindrical inside surface 130. The free end 132 of the barrel portion in the disclosed embodiment includes a conical chamfer 134 and an arcuate drawing surface 136. The body portion 122 of the disclosed female nut-type fastener includes a threaded bore 138 coaxially aligned with the inside surface 130 of the barrel portion.

In the disclosed embodiment, the body portion 122 is hexagonal having six flat surfaces 140 and the axial grooves 148 are defined in the juncture of the adjacent flat surfaces as shown in FIG. 7. The radial flange portion 124 includes a flat driven surface 142, a cylindrical outside surface 144 and a clinching surface 146. The axial grooves 148 continue radially from the body portion 122 into the clinching surface 146 of the flange portion to define radial grooves 150. The nut fastener shown in FIGS. 6 to 8 is somewhat easier to manufacture and feed than the fastening element disclosed in FIGS. 1 to 3. However, as described below, the fastening element disclosed in FIGS. 1 to 3 provides a more secure installation, which is an object of the present invention.

The fastening element shown in FIGS. 6 to 8 may be installed in the installation apparatus shown in FIGS. 11 and 12. As described above, the installation apparatus includes a nose assembly 72 having a bore 73 which receives reciprocating plunger 74. The plunger 74 includes a bore 75 which receives reciprocating punch 76. The cylindrical piercing end 77 of the punch is driven against the panel to first draw the panel into a cone-shaped portion 62 as described above and shown in U.S. Pat. No. 4,831,698. The piercing end 77 of the punch then pierces a small slug from the panel and the free end 132 of the barrel portion of the nut fastener is then driven into and through the panel opening. The body portion 122 of the nut fastener is then driven into the cone-shaped panel portion 162, deforming panel into the axial grooves 148. Finally, the clinching surface 146 of the radial flange portion 124 is driven into the panel, deforming panel metal into the radial grooves 150.

The purpose of the conical chamfered surface 134 and drawing surface 136 at the free end 132 of the pilot portion will be understood from FIG. 10. The chamfered surface 136 first contacts the convex arcuate surface adjacent the free end of the central die post 90. As the barrel portion is driven into the annular die cavity 91 which surrounds the central die post, the chamfered surface is driven against the concave arcuate die cavity and the free end is deformed radially outwardly as shown in FIGS. 9 and 10. It should be noted that the free end of the barrel portion of the female fastening element 120 is deformed into a generally L-shaped portion 154, rather than a U-shaped channel 54 as shown in FIG. 4. This is because the tubular barrel portion 126 is shorter in relation to the body portion 122 than the nut shown in FIGS. 1 to 3. The larger hexagonal body portion 122, however, simplifies feeding and orienting the nut fastener.

As described above, the improved self-attaching fastening element of this invention was developed for applications requiring a very secure fastener and panel assembly, such as required for automotive seat applications, including improved torque resistance and push-through strength. The torque resistance of the nut and panel assembly disclosed in U.S. Pat. No. 4,831,698 was 48 newton-meters. The resistance to torque was measured by threading a hardened M8 bolt into the nut and panel assembly shown in FIGS. 4 and 10 and applying torque to the bolt. The same torque test conducted with the nut and panel assembly shown in FIGS. 4 and 10 resulted in torsional failure of the bolt at 57.4 newton-meters without distortion of the nut in the thin panel. That is, the bolt failed before distortion of the nut and panel assembly. Thus, the torque resistance was improved at least twenty percent. The push-through strength was also improved significantly. The push-through strength is measured by threadably inserting a bolt in the nut and panel assembly shown in FIGS. 4 and 10 and driving the bolt downwardly in the direction the nut is inserted in the panel. The push-through strength of the nut and panel assembly disclosed in the above-referenced U.S. Pat. No. 4,831,698 is 8.5 kilo-newtons. The push-through strength of the nut and panel assembly shown in FIGS. 9 and 10 is 14 kilo-newtons. However, the push-through strength of the nut and panel assembly shown in FIG. 4 is 26 kilo-newtons.

The self-attaching fastening element and method of assembly of this invention therefore provides important advantages over the fastener and assembly disclosed in U.S. Pat. No. 4,831,698 and the prior art. The fastener and panel assembly has a significantly improved torque resistance and push-through strength. The pull-out strength of the fastener and panel assembly shown in FIG. 4 is equal to the improved pull-out strength of the original fastener. The improved torque resistance results from the unique groove configurations. It should be noted, however, that improved torque resistance may also be achieved over prior designs where the body portion is cylindrical, rather than polygonal. The installation apparatus has also been improved by locating the annular cavity 91 within the outside dimension of the reciprocal die post member 82, significantly reducing failures of the die button. Of course, the method of installation has also been improved by deforming panel metal into the axial and radial grooves during the installation of the fastener in the panel. In certain applications where the torque resistance requirements are not as stringent, the radial grooves may not be required. Thus, as will be understood by those skilled in the art, modifications may be made to the disclosed embodiments of the self-riveting nut fasteners 20 and 120 within the purview of the appended claims. For example, certain applications may not require a radial flange. In other applications, the nut body may be octagonal to provide greater torque resistance or the nut body may be cylindrical. Finally, the improvements disclosed herein may also be applied to the stud-type fasteners disclosed, for example, in U.S. Pat. No. 4,555,838.

Having thus described the improved self-attaching fastening element, method of installation and installation apparatus of this invention, the invention is now claimed, as follows:

1. A self-attaching fastening element, said fastening element including a body portion and an integral generally coaxially aligned annular riveting barrel portion, said body portion having a polygonal exterior surface including a plurality of generally flat surfaces, and said annular barrel portion having a generally cylindrical exterior surface having a diameter less than a major diameter of said polygonal body portion, and said body portion including a plurality of axial grooves extending generally parallel to an axis of said annular barrel portion and said grooves defined on the juncture of adjacent flat surfaces of said body portion, said grooves having a lateral width which is substantially less than the width of said flat surfaces measured laterally, said grooves preventing relative rotation of said fastening element in a work member when said body portion is driven into said work member:

said body portion includes an integral radially projecting flange portion opposite said barrel portion, and said grooves extending radially into said flange portion.

2. The self-attaching fastening element defined in claim 1, characterized in that said fastening element is a nut-type fastener having a threaded bore extending through said body portion coaxially aligned with an internal surface of said annular riveting barrel portion, and said body portion including a generally conical portion extending from said flat surfaces to said generally cylindrical exterior surface of said barrel portion, and said grooves extending into said flange portion and into said generally conical portion.

3. The self-attaching fastening element defined in claim 1, characterized in that said grooves having an arcuate concave surface with an inner surface generally coaxially aligned with said cylindrical exterior surface of said annular barrel portion.

4. A self-attaching fastening element, said fastening element including a body portion, an integral radially extending flange portion at one end of said body portion, and an integral generally coaxially aligned generally cylindrical annular riveting barrel portion extending from an opposite end of said body portion, said body portion having a diameter greater than said riveting barrel portion and a generally conical continuous surface smoothly blending into said barrel portion, and including a plurality of spaced axial grooves extending generally parallel to a common axis of said body and barrel portions, and said grooves extending axially from said body portion into said conical surface to adjacent said generally cylindrical barrel portion, said grooves preventing relative rotation of said fastening element with a work member when said body portion and flange are driven into said work member:

said body portion has a polygonal exterior surface including a plurality of flat surfaces having a width measured perpendicular to said common axis substantially greater than said grooves, said grooves in said body portion extending axially between adjacent flat surfaces in said body portion into said generally conical continuous surface.

5. The self-attaching fastening element defined in claim 4, characterized in that said grooves in said body portion have an arcuate concave surface with an inner surface generally coaxially aligned with an exterior surface of said cylindrical annular barrel portion.

6. The self-attaching fastening element defined in claim 4, characterized in that said fastening element is a female nut-type fastener including a bore extending through said flange and body portions coaxially aligned with an internal surface of said annular barrel portion.

7. A self-riveting female fastening element, said fastening element including a polygonal body portion having a plurality of generally flat exterior surfaces, an integral radial flange portion at one end of said body portion extending radially generally perpendicular to an axis of said body portion, said flange portion having a generally cylindrical exterior surface having a diameter greater than a major diameter of said polygonal body portion, and an integral generally coaxially aligned annular cylindrical riveting barrel portion extending from an opposite end of said body portion and said body portion including a continuous generally conical surface extending from said flat surfaces to said cylindrical barrel portion and smoothly blending into said barrel portion, an axial bore extending through said flange and body portions, said annular riveting barrel portion including a cylindrical internal surface coaxially aligned with said bore, and said body portion including a plurality of axial grooves defined in said body portion in the juncture of adjacent flat surfaces, said grooves extending into said continuous generally conical surface, said flat exterior surfaces of said body portion each having a lateral width substantially greater than the lateral width of said grooves, said grooves preventing relative rotation of said female fastening element in a work member when said fastening element body portion is driven into said work member.

8. The female fastening element defined in claim 7, characterized in that said grooves extend radially from said body portion into said flange portion adjacent said body portion.

9. A self-attaching fastening element, said fastening element including a body portion and an integral generally coaxially aligned annular riveting barrel portion, said body portion having a polygonal exterior surface including a plurality of generally flat surfaces, and said annular barrel portion having a generally cylindrical exterior surface having a diameter less than a major diameter of said polygonal body portion, and said body portion including a plurality of axial grooves extending generally parallel to an axis of said annular barrel portion and said grooves defined on the juncture of adjacent flat surfaces of said body portion, said grooves having a lateral width which is substantially less than the width of said flat surfaces measured laterally, said grooves preventing relative rotation of said fastening element in a work member when said body portion is driven into said work member;

said fastening element is a nut-type fastener having a threaded bore extending through said body portion coaxially aligned with an internal surface of said annular riveting barrel portion, and said body portion including a radially projecting flange portion opposite said barrel portion and a generally conical portion extending from said flat surfaces to said generally cylindrical exterior surface of said barrel portion, and said grooves extending into said flange portion and into said generally conical portion.

10. The self attaching fastening element defined in claim 9, characterized in that said body portion includes said grooves extending radially into said flange portion.

11. The self attaching fastening element defined in claim 9, characterized in the said grooves having an arcuate concave surface with an inner surface generally coaxially aligned with said cylindrical exterior surface of said annular barrel portion.

12. A self-attaching fastening element, said fastening element including a body portion, an integral radially extending flange portion at one end of said body portion, and an integral generally coaxially aligned generally cylindrical annular riveting barrel portion extending from an opposite end of said body portion, said body portion having a diameter greater than said riveting barrel portion and a generally conical continuous surface smoothly blending into said barrel portion, and including a plurality of spaced axial grooves extending generally parallel to a common axis of said body and barrel portions, and said grooves extending axially from said body portion into said conical surface to adjacent said generally cylindrical barrel portion, said grooves preventing relative rotation of said fastening element with a work member when said body portion and flange are driven into said work member;

said grooves in said body portion having an arcuate concave surface with an inner surface generally coaxially aligned with an exterior surface of said cylindrical annular barrel portion.

13. The self attaching fastening element defined in claim 12, wherein said body portion has a polygonal exterior surface including a plurality of flat surfaces, said grooves in said body portion extending axially between adjacent flat surfaces in said body portion.

* * * * *